United States Patent
Takizawa

(10) Patent No.: US 8,871,832 B2
(45) Date of Patent: Oct. 28, 2014

(54) RUBBER COMPOSITION FOR USE IN TIRE TREADS AND PNEUMATIC TIRE USING THE SAME

(75) Inventor: Yoichi Takizawa, Hiratsuka (JP)

(73) Assignee: The Yokohama Rubber Co., Ltd (JP)

( * ) Notice: Subject to any disclaimer, the term of this patent is extended or adjusted under 35 U.S.C. 154(b) by 222 days.

(21) Appl. No.: 13/035,809

(22) Filed: Feb. 25, 2011

(65) Prior Publication Data

US 2011/0213049 A1   Sep. 1, 2011

(30) Foreign Application Priority Data

Feb. 26, 2010   (JP) ................. 2010-041331

(51) Int. Cl.
| | | |
|---|---|---|
| C08L 9/00 | (2006.01) | |
| B60C 1/00 | (2006.01) | |
| C08L 7/00 | (2006.01) | |
| C08L 9/06 | (2006.01) | |
| C08L 21/00 | (2006.01) | |
| C08K 3/04 | (2006.01) | |
| C08L 57/00 | (2006.01) | |
| C08K 3/00 | (2006.01) | |
| C08L 93/04 | (2006.01) | |

(52) U.S. Cl.
CPC ............... C08L 9/06 (2013.01); B60C 1/0016 (2013.04); C08L 7/00 (2013.01); *C08K 3/04* (2013.01); *C08L 57/00* (2013.01); *C08K 3/0033* (2013.01); *C08L 93/04* (2013.01); *C08L 21/00* (2013.01)
USPC ........................................ 523/156

(58) Field of Classification Search
CPC ........... C08L 93/04; C08L 9/06; C08L 21/00
USPC .......................................... 524/270
See application file for complete search history.

(56) References Cited

U.S. PATENT DOCUMENTS

| 4,581,400 | A | * | 4/1986 | Kondo ..................... 524/274 |
| 4,624,296 | A | * | 11/1986 | Takiguchi ................ 152/209.1 |
| 5,219,944 | A | * | 6/1993 | Scriver et al. .............. 525/233 |
| 5,227,424 | A | * | 7/1993 | Tokieda et al. ............. 524/484 |
| 5,396,940 | A | * | 3/1995 | Segatta et al. ........... 152/209.1 |
| 6,201,059 | B1 | * | 3/2001 | Wideman et al. ........... 524/518 |
| 6,489,389 | B1 | * | 12/2002 | Ohta et al. ................. 524/437 |
| 7,029,544 | B2 | * | 4/2006 | Lanzarotta et al. ........ 156/110.1 |
| 2006/0167160 | A1 | * | 7/2006 | Nakagawa et al. .......... 524/442 |
| 2007/0037915 | A1 | * | 2/2007 | Masumoto .................. 524/492 |
| 2007/0167555 | A1 | * | 7/2007 | Amino et al. .............. 524/495 |
| 2009/0326109 | A1 | * | 12/2009 | Kameda et al. ............. 524/110 |

FOREIGN PATENT DOCUMENTS

| JP | 2009-138025 | * | 6/2009 |
| WO | WO2005090463 | | 9/2005 |

OTHER PUBLICATIONS

Derwent Abstract of JP 2009-138025.*

* cited by examiner

*Primary Examiner* — Doris Lee
(74) *Attorney, Agent, or Firm* — Thorpe North & Western LLP

(57) ABSTRACT

Rubber compositions for use in tire treads are disclosed and described. Such a composition may include a rubber component having from 40 to 80 parts by mass of a natural rubber and from 20 to 60 parts by mass of a diene rubber (other than said natural rubber) and, per 100 parts by mass thereof, from 80 to 150 parts by mass of a carbon black having a nitrogen specific surface area of from 250 to 450 $m^2/g$ and from 30 to 80 parts by mass of a resin.

18 Claims, 1 Drawing Sheet

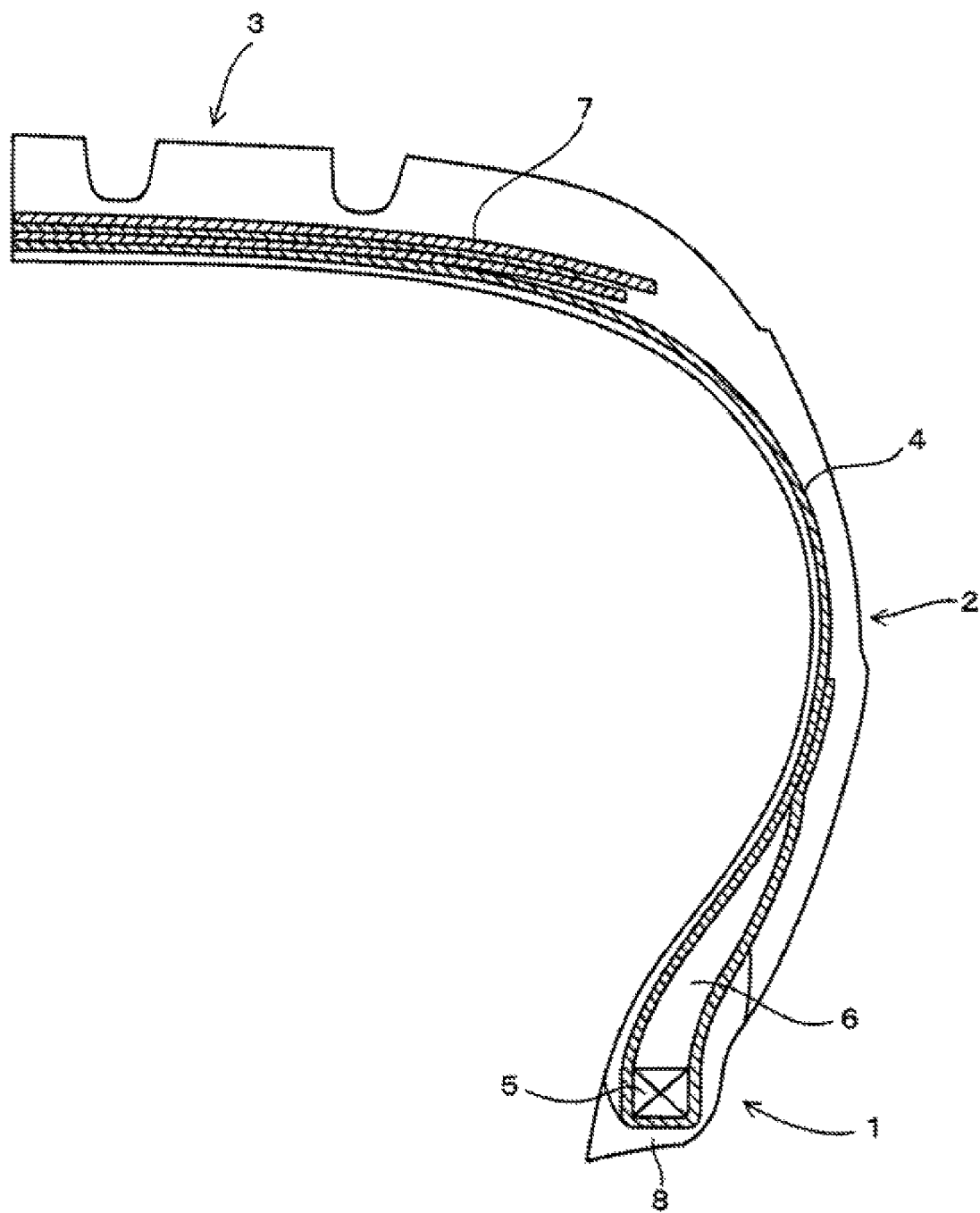

_(1)_

RUBBER COMPOSITION FOR USE IN TIRE TREADS AND PNEUMATIC TIRE USING THE SAME

PRIORITY CLAIM

Priority is claimed to Japan Patent Application Serial No. 2000-041331 filed on 26 Feb. 2010, the contents of which is incorporated herein by reference in its entirety.

BACKGROUND

1. Technical Field

The present disclosure relates to a rubber composition for use in tire treads and a pneumatic tire using the same, and particularly relates to a rubber composition for use in tire treads and a pneumatic tire using the same having high grip performance at initial traveling, wherein said performance is maintained for an extended period of time while traveling, even after heat builds up in the tread, and also having superior wear resistance.

2. Related Art

Conventionally, there has been a demand that racing tires have high grip performance from initial traveling and maintain high grip performance even after heat builds up in the tread. It is also important that this performance be balanced with wear resistance.

A technique for enhancing grip performance exists wherein a styrene-butadiene copolymer rubber (SBR) with a high glass transition temperature (Tg) is compounded. However, with this technique, there is a problem in that grip performance at initial traveling and wear resistance is sacrificed. Additionally, techniques also exist including compounding a large amount of carbon black having a small particle size or compounding a tackifying resin having a high softening point. However, while these techniques lead to enhancements in grip performance, there are problems in that grip performance is not maintained and wear resistance is inferior with the former technique and grip performance at initial traveling is sacrificed with the latter technique.

WO/2005/090463 describes a pneumatic tire using as a tread rubber a rubber composition comprising a rubber component containing 80 wt % or more of a natural rubber and/or an isoprene rubber and, per 100 parts by weight thereof, 20 parts by weight or more of an inorganic filler constituted by non-petroleum resources and 10 parts by weight or more of a resin having a softening point of 60° C. or higher. However, with the technique described in WO/2005/090463, the conventional problems remain and, specifically, it does not sufficiently maintain grip performance including that at initial traveling and wear resistance at a high level.

SUMMARY

Therefore, the present technology provides a rubber composition for use in tire treads and a pneumatic tire using the same, having high grip performance at initial traveling, wherein said performance is maintained for an extended period of time while traveling even after heat builds up in the tread, and also having superior wear resistance. The inventors, as a result of diligent research, discovered that the present technology can be achieved by compounding a specific amount of a carbon black having specific properties and a specific amount of a resin in a mixture of specific rubber components, and thus arrived at the present technology.

Specifically, a rubber composition for use in tire treads can include a rubber component including from 40 to 80 parts by mass of a natural rubber and from 20 to 60 parts by mass of a diene rubber (other than said natural rubber) and, per 100 parts by mass thereof, from 80 to 150 parts by mass of a carbon black having a nitrogen specific surface area of from 250 to 450 m$^2$/g and from 30 to 80 parts by mass of a resin.

The diene rubber can be a styrene-butadiene copolymer rubber having a glass transition temperature of from −35 to 0° C.

The resin can be a terpene resin having a softening point of from 80 to 170° C.

In one example, the rubber composition can be used to form a tread of a pneumatic tire. According to the present technology, a specific amount of a carbon black having specific properties and a specific amount of a resin is compounded in a mixture of specific rubber components. Thereby, a rubber composition for use in tire treads and a pneumatic tire using the same having high grip performance at initial traveling, wherein said performance is maintained for an extended period of time while traveling even after heat builds up in the tread, and also having superior wear resistance can be provided.

BRIEF DESCRIPTION OF THE DRAWING

FIG. 1 is a partial cross-sectional view of an example of a pneumatic tire.

DETAILED DESCRIPTION

The present technology is explained in further detail below.

FIG. 1 is a partial cross-sectional view of an example of a pneumatic tire for a passenger vehicle according to the present technology.

In FIG. 1, the pneumatic tire is shown being formed from a pair of right and left bead portions 1, a pair of right and left side walls 2, and a tread 3 extending between both side walls 2. A carcass layer 4 embedded with fiber cords is mounted between the bead portions 1,1. An end of the carcass layer 4 is folded over and up from a tire inner side to a tire outer side around a bead core 5 and a bead filler 6. In the tread 3, a belt layer 7 is provided along an entire periphery of the tire on an outer side of the carcass layer 4. Additionally, rim cushions 8 are provided in parts of the bead portions 1 that are in contact with a rim.

The rubber composition for use in tire treads of the present technology described below is especially useful in the tread 3.

Rubber Component

A rubber component used in the present technology is constituted by from 40 to 80 parts by mass of a natural rubber and from 20 to 60 parts by mass of a diene rubber (other than said natural rubber). Note that a total of the natural rubber and the diene rubber is equal to 100 parts by mass.

Examples of the diene rubber include isoprene rubber (IR), butadiene rubber (BR), styrene-butadiene copolymer rubber (SBR), acrylonitrile-butadiene copolymer rubber (NBR), and the like. One of these may be used alone, or two or more may be used in any combination.

If a compounded amount of the natural rubber (NR) is less than 40 parts by mass, grip performance at initial traveling and wear resistance will be negatively affected. Likewise, it is not preferable that the compounded amount exceed 80 parts by mass because grip maintainability will be negatively affected.

It is more preferable that from 50 to 70 parts by mass of the natural rubber and from 30 to 50 parts by mass of the diene rubber (other than said natural rubber) be compounded.

In the present technology, the diene rubber is preferably a styrene-butadiene copolymer rubber (SBR) having a glass transition temperature (Tg) of from −35 to 0° C. because, in such a case, the effect of the present technology can be further enhanced.

Sufficient grip performance is provided after heat builds up in the tread due to the TG of the SBT being −35° C. or higher. Additionally, grip performance at initial traveling can be further enhanced due to the Tg of the SBR being 0° C. or lower.

Carbon Black

A nitrogen specific surface area ($N_2SA$) of a carbon black used in the present technology must be from 250 to 450 $m^2/g$. If the N2SA is outside this range, the effects of the present technology cannot be achieved. The nitrogen specific surface area ($N_2SA$) is a value calculated in accordance with Japanese Industrial Standard (JIS) K6217-2. It is more preferable that the nitrogen specific surface area ($N_2SA$) be from 300 to 400 $m^2/g$.

Resin

Examples of the resin used in the present technology include natural resins such as terpene resins, rosin resins, and the like; and synthetic resins such as petroleum resins, carboniferous resins, phenol resins, xylene resins, and the like.

Of these, terpene resins are preferable, and examples of the terpene resins include α-pinene resin, β-pinene resin, limonene resin, hydrogenated limonene resin, dipentene resin, terpene phenol resin, terpene styrene resin, aromatic modified terpene resin, hydrogenated terpene resin, and the like. Additionally, in the present technology, a softening point of the terpene resin is preferably from 80 to 170° C. Sufficient grip performance is obtained at initial traveling and at continued traveling, and wear resistance is enhanced due to the softening point being 80° C. or higher. Moreover, grip performance at initial traveling is enhanced due to the softening point being 170° C. or lower.

Filler

The rubber composition for use in tire treads of the present technology can be compounded with various fillers. The fillers are not particularly limited, and may be selected as necessary based on the intended application. Examples of the fillers include inorganic fillers and the like. Examples of the inorganic fillers include silica, clay, talc, calcium carbonate, and the like.

Composition Ratios of the Rubber Composition for Use in Tire Treads

The rubber composition for use in tire treads of the present technology includes: a rubber component including from 40 to 80 parts by mass of the natural rubber and from 20 to 60 parts by mass of the diene rubber (other than said natural rubber) and, per 100 parts by mass thereof, from 80 to 150 parts by mass of the carbon black having a nitrogen specific surface area of from 250 to 450 $m^2/g$ and from 30 to 80 parts by mass of the resin.

It is not preferable that a compounded amount of the carbon black be less than 80 parts by mass because grip performance will be negatively affected. Likewise, if the compounded amount exceeds 150 parts by mass, wear resistance will decline significantly.

It is not preferable that a compounded amount of the resin be less than 30 parts by mass because sufficient grip performance will not be obtained. Likewise, it is not preferable that the compounded amount exceed 80 parts by mass because grip performance at initial traveling will be sacrificed.

It is more preferable that from 80 to 130 parts by mass of the carbon black be compounded.

It is more preferable that from 40 to 70 parts by mass of the resin be compounded.

In addition to the aforementioned components, the rubber composition for use in tire treads of the present technology can also contain various types of additives that are commonly added for tires or for other rubber compositions, such as vulcanizing and cross-linking agents, vulcanizing and cross-linking accelerators, various types of oils, antiaging agents, plasticizers, and the like. The additives may be kneaded in according to a general method and used in vulcanizing or cross-linking Compounded amounts of these additives may be any conventional standard amount, so long as the object of the present technology is not hindered.

Additionally, the rubber composition for use in tire treads of the present technology can be used to manufacture a pneumatic tire according to a conventional method for manufacturing pneumatic tires.

EXAMPLES

The present technology is further explained in detail, referring to the examples and comparative examples described hereinafter. However, the present technology is not limited by these examples.

Examples 1 to 7 and Comparative Examples 1 to 5

Preparation of Sample

According to the compounding amounts (parts by mass) shown in Table 1, the components, other than the vulcanization accelerator and the sulfur, were kneaded for 15 minutes in a 55 liter kneader. Then, the composition was discharged from the kneader, shaped into a sheet using a roller, and cooled to room temperature. Thereafter, the rubber composition for use in tire treads was obtained by placing the composition in the same kneader again, adding the vulcanization accelerator and the sulfur and kneading.

Grip Performance

Test tires having a size of 195/55R15 using the rubber compositions prepared as described above in their treads were fabricated. Next, the test tires were mounted on the four wheels of a four-wheel vehicle, and the vehicle was driven continually at a maximum potential speed for ten laps around a circuit course (1 lap=2.2 km) under dry conditions.

Initial Grip Performance: In order to evaluate grip performance at initial traveling when high-speed traveling, an average value of the times of lap 1 to lap 3 was calculated. Evaluation according to the following five levels was performed based on an average time of lap 1 to lap 3 obtained for the tires using the rubber composition of Comparative Example 1 in the tread as a standard of reference.

5: At least 0.5 seconds faster than the standard of reference
4: At least 0.2 seconds faster but less than 0.5 seconds faster than the standard of reference
3: Within ±0.2 seconds of the standard of reference
2: At least 0.2 seconds slower but less than 0.5 seconds slower than the standard of reference
1: At least 0.5 seconds slower than the standard of reference Grip Maintainability Performance: In order to evaluate changes in grip performance when traveling at high-speeds, an average value of the times of lap 8 to lap 10 of the ten laps traveled described above was calculated. Evaluation according to the following five levels was performed based on an average time of lap 8 to lap 10 obtained for the tires using the rubber composition of Comparative Example 1 in the tread as a standard of reference.

5: At least 0.5 seconds faster than the standard of reference
4: At least 0.2 seconds faster but less than 0.5 seconds faster than the standard of reference 3: Within ±0.2 seconds of the standard of reference
2: At least 0.2 seconds slower but less than 0.5 seconds slower than the standard of reference
1: At least 0.5 seconds slower than the standard of reference Wear resistance: Vulcanized rubber test samples were fabricated by high-pressure vulcanizing the rubber compositions for use in tire treads obtained as described above in a predetermined mold at 160° C. for 20 minutes. Wear resistance for each of the obtained vulcanized rubber test samples was measured using a Pico Abrasion Tester (manufactured by Ferry Machine Co.) in accordance with JIS K6264. The measurement results are shown as an index with Comparative Example 1 being 100.
Larger index values indicate superior wear resistance.
The results are also shown in Table 1.

With the rubber compositions for use in tire treads fabricated according to Examples 1 to 7, a specific amount of a carbon black having specific properties and a specific amount of a resin is compounded in a mixture of specific rubber components. Therefore, as is clearly shown in Table 1, when compared with the rubber composition of Comparative Example 1, which is representative of conventional rubber compositions, the rubber compositions for use in tire treads fabricated according to Examples 1 to 7 have superior grip performance, including grip performance at initial traveling, the grip performance is maintained for an extended period of time while traveling, and a high level of wear resistance is maintained.

TABLE 1

| | | CE 1 | CE 2 | CE 3 | CE 4 | Ex. 1 | Ex. 2 | Ex. 3 | Ex. 4 | Ex. 5 | Ex. 6 | CE 5 | Ex. 7 |
|---|---|---|---|---|---|---|---|---|---|---|---|---|---|
| Formulation (parts by mass) | NR *1 | — | — | — | 20 | 40 | 55 | 70 | 55 | 55 | 55 | 55 | 55 |
| | SBR-1 *2 | — | — | — | — | — | — | — | — | — | — | — | 61.88 |
| | SBR-2 *3 | 150 | 150 | 150 | 120 | 90 | 67.5 | 45 | — | 67.5 | 67.5 | 67.5 | — |
| | SBR-3 *4 | — | — | — | — | — | — | — | 67.5 | — | — | — | — |
| | Carbon Black-1 *5 | 120 | — | — | — | — | — | — | — | — | — | — | — |
| | Carbon Black-2 *6 | — | 120 | 120 | 120 | 120 | 120 | 120 | 120 | 120 | 120 | — | 120 |
| | Carbon Black-3 *7 | — | — | — | — | — | — | — | — | — | — | 120 | — |
| | Aromatic Modified Terpene Resin-1 *8 | — | — | 50 | 50 | 50 | 50 | 50 | 50 | — | — | 50 | 50 |
| | Aromatic Modified Terpene Resin-2 *9 | — | — | — | — | — | — | — | — | 50 | — | — | — |
| | Terpene Phenol Resin *10 | — | — | — | — | — | — | — | — | — | 50 | — | — |
| | Oil *11 | 70 | 70 | 20 | 30 | 40 | 47.5 | 55 | 47.5 | 47.5 | 47.5 | 47.5 | 53.13 |
| | Antiaging agent *12 | 2 | 2 | 2 | 2 | 2 | 2 | 2 | 2 | 2 | 2 | 2 | 2 |
| | Zinc Oxide *13 | 2 | 2 | 2 | 2 | 2 | 2 | 2 | 2 | 2 | 2 | 2 | 2 |
| | Stearic Acid *14 | 2 | 2 | 2 | 2 | 2 | 2 | 2 | 2 | 2 | 2 | 2 | 2 |
| | Vulcanization Accelerator *15 | 2 | 2 | 2 | 2 | 2 | 2 | 2 | 2 | 2 | 2 | 2 | 2 |
| | Sulfur *16 | 2 | 2 | 2 | 2 | 2 | 2 | 2 | 2 | 2 | 2 | 2 | 2 |
| Physical Property Values | Initial Grip Performance: | 3 | 2 | 1 | 2 | 4 | 5 | 5 | 4 | 5 | 4 | 2 | 3 |
| | Grip Maintainability Performance | 3 | 3 | 4 | 4 | 5 | 5 | 4 | 5 | 5 | 5 | 3 | 3 |
| | Wear resistance | 100 | 90 | 88 | 95 | 105 | 110 | 120 | 103 | 110 | 105 | 94 | 125 |

Notes to Table 1:
The abbreviations used in the column headings are as followings: "Ex." is an abbreviation of "Example"; "CE" is an abbreviation of "Comparative Example"
*1 NR (TSR20)
*2 SBR-1 (TUFDENE™ 2330, manufactured by Asahi Kasei Chemicals Corporation; Tg = −50° C.; Oil extender content = 37.5 parts by mass per 100 parts by mass of SBR)
*3 SBR-2 (TUFDENE™ 4350, manufactured by Asahi Kasei Chemicals Corporation; Tg = −22° C.; Oil extender content = 50 parts by mass per 100 parts by mass of SBR)
*4 SBR-3 (Nipol NS412, manufactured by Zeon Corporation; Tg = −6° C.; Oil extender content = 50 parts by mass per 100 parts by mass of SBR)
*5 Carbon black-1 (Cabot Black Pearls 880, manufactured by Cabot Japan K.K.; nitrogen specific surface area ($N_2SA$) = 220 $m^2/g$)
*6 Carbon black-2 (CD2019, manufactured by Columbian Chemicals Company; nitrogen specific surface area ($N_2SA$) = 340 $m^2/g$)
*7 Carbon black-3 (Cabot Black Pearls 1300, manufactured by Cabot Japan K.K.; nitrogen specific surface area ($N_2SA$) = 560 $m^2/g$)
*8 Aromatic modified terpene resin-1 (YS Resin TO85, manufactured by Yasuhara Chemical Co., Ltd.; Softening point = 85 ± 5° C.)
*9 Aromatic modified terpene resin-2 (YS Resin TO125, manufactured by Yasuhara Chemical Co., Ltd.; Softening point = 125 ± 5° C.)
*10 Terpene phenol resin (YS Polyester T160, manufactured by Yasuhara Chemical Co., Ltd.; Softening point = 160 ± 5° C.)
*11 Oil (Extract No. 4S, manufactured by Showa Shell Sekiyu K.K.)
*12 Antiaging agent (Santoflex 6PPD, manufactured by Flexsys)
*13 Zinc oxide (Zinc Oxide #3, manufactured by Seido Chemical Industry Co., Ltd.)
*14 Stearic acid (Stearic Acid YR, manufactured by NOF Corp.)
*15 Vulcanization accelerator (Noccelar CZ-G made by Ouchi Shinko Chemical Industrial Co., Ltd.)
*16 Sulfur ("Golden Flower" Oil Treated Sulfur Powder, manufactured by Tsurumi Chemical)

In contrast, the NR and the resin were not compounded in Comparative Example 2, and this resulted in grip performance at initial traveling and wear resistance being negatively affected.

The NR was not compounded in Comparative Example 3, and this resulted in grip performance at initial traveling and wear resistance being negatively affected.

The compounded amount of the NR in Comparative Example 4 was below the minimum as stipulated in the present technology, and this resulted in grip performance at initial traveling and wear resistance being negatively affected.

The nitrogen specific surface area (NSA) of the carbon black in Comparative Example 5 exceeded the maximum as stipulated in the present technology, and this resulted in grip performance at initial traveling and wear resistance being negatively affected.

What is claimed is:

1. A rubber composition for use in tire treads comprising: a rubber component comprising from 40 to 80 parts by mass of a natural rubber and from 20 to 60 parts by mass of a diene rubber (other than said natural rubber) and, per 100 parts by mass thereof, from 80 to 150 parts by mass of a carbon black having a nitrogen specific surface area of from 300 to 400 m$^2$/g and from 30 to 80 parts by mass of a resin, wherein the resin is selected from the group consisting of: α-pinene resin, β-pinene resin, limonene resin, dipentene resin, and terpene styrene resin; and wherein the diene rubber is a styrene-butadiene copolymer rubber having a glass transition temperature of from −35 to 0° C.

2. The rubber composition for use in tire treads according to claim 1, wherein the resin has a softening point of from 130 to 170° C.

3. The rubber composition for use in tire treads according to claim 1, wherein the rubber component comprises from 50 to 70 parts by mass of the natural rubber.

4. The rubber composition for use in tire treads according to claim 1, wherein the rubber component comprises from 30 to 50 parts by mass of the diene rubber.

5. The rubber composition for use in tire treads according to claim 1, wherein the nitrogen specific surface area (N$_2$SA) of the carbon black is from 300 to 400 m$^2$/g.

6. The rubber composition for use in tire treads according to claim 1, wherein the carbon black comprises from 120 to 150 parts by mass per 100 parts by mass of the rubber component.

7. The rubber composition for use in tire treads according to claim 1, wherein the resin comprises from 40 to 70 parts by mass per 100 parts by mass of the rubber component.

8. The rubber composition for use in tire treads according to claim 1, wherein the resin has a softening point of from 80 to 170° C.

9. The rubber composition for use in tire treads according to claim 1, wherein the resin has a softening point of from 155 to 170° C.

10. The rubber composition for use in tire treads according to claim 1, wherein the styrene butadiene rubber is an oil-extended product with an oil extender content, the rubber composition further comprising an oil in an amount of from 40 to 55 parts by mass per 100 parts by mass of the rubber component, the oil being an oil content in addition to the oil extender content in the styrene butadiene rubber.

11. The rubber composition for use in tire treads according to claim 1, wherein the carbon black has a nitrogen specific surface area of from 400 to 450 m$^2$/g.

12. The rubber composition for use in tire treads according to claim 1, wherein the resin is selected from the group consisting of: αpinene resin, limonene resin, dipentene resin, and terpene styrene resin.

13. The rubber composition for use in tire treads according to claim 1, further comprising a filler.

14. The rubber composition for use in tire treads according to claim 13, wherein the filler comprises an inorganic filler.

15. The rubber composition for use in tire treads according to claim 14, wherein the inorganic filler is selected from the group consisting of clay, talc, and calcium carbonate.

16. A pneumatic tire comprising a tread formed using the rubber composition for use in tire treads according to claim 1.

17. The pneumatic according to claim 16, wherein the diene rubber in the rubber composition is a styrene-butadiene copolymer rubber having a glass transition temperature of from −35 to 0° C., and wherein the resin in the rubber composition has a softening point of from 80 to 170° C.

18. A rubber composition for use in tire treads comprising:
a rubber component comprising from 50 to 70 parts by mass of a natural rubber and from 30 to 50 parts by mass of a diene rubber (other than said natural rubber) and, per 100 parts by mass thereof, from 80 to 150 parts by mass of a carbon black having a nitrogen specific surface area of from 400 to 450 m$^2$/g and from 30 to 80 parts by mass of a terpene resin;
wherein the diene rubber is a styrene-butadiene copolymer rubber having a glass transition temperature of from −35 to 0° C.

* * * * *